United States Patent
Matters et al.

(10) Patent No.: US 7,621,391 B2
(45) Date of Patent: Nov. 24, 2009

(54) IDLER FRAME ASSEMBLY

(75) Inventors: Corey Matters, Tuart Hill (AU); Gary Pegg, Donnybrook (AU)

(73) Assignee: Matters Enterprises Pty Ltd, Tuart Hill (AU)

( * ) Notice: Subject to any disclaimer, the term of this patent is extended or adjusted under 35 U.S.C. 154(b) by 242 days.

(21) Appl. No.: 11/549,805

(22) Filed: Oct. 16, 2006

(65) Prior Publication Data

US 2007/0170044 A1    Jul. 26, 2007

(30) Foreign Application Priority Data

Oct. 14, 2005    (AU) .............................. 2005905690

(51) Int. Cl.
  *B65G 15/08*    (2006.01)
  *B65G 15/60*    (2006.01)
(52) U.S. Cl. ...................... 198/825; 198/829
(58) Field of Classification Search .......... 198/824–830
  See application file for complete search history.

(56) References Cited

U.S. PATENT DOCUMENTS

| | | | | |
|---|---|---|---|---|
| 3,217,862 A | * | 11/1965 | Herrmann | 198/830 |
| 3,259,227 A | * | 7/1966 | Steinmetz | 198/501 |
| 3,356,206 A | * | 12/1967 | Lantz | 198/828 |
| 3,815,724 A | * | 6/1974 | Nott | 198/830 |
| 5,657,857 A | | 8/1997 | Neilson et al. | |
| 5,988,361 A | * | 11/1999 | Giacomin et al. | 198/830 |
| 6,427,828 B1 | * | 8/2002 | East et al. | 198/826 |
| 6,634,490 B2 | * | 10/2003 | Fischer et al. | 198/826 |
| 7,287,642 B1 | * | 10/2007 | Carr et al. | 198/861.1 |
| 2004/0079621 A1 | * | 4/2004 | Mott | 198/823 |

* cited by examiner

*Primary Examiner*—Mark A Deuble
(74) *Attorney, Agent, or Firm*—Duane Morris LLP

(57) ABSTRACT

The present invention relates to an idler frame assembly for a conveyor, the idler frame assembly including a fixed frame assembly mounted on the main frame, a roller support assembly slidably engaged with the fixed frame assembly, the roller support assembly being slidable relative to the fixed frame assembly between an operative configuration and a non-operative configuration, the roller support assembly including a pivotable roller support frame, the pivotable roller support frame being pivotable between a raised operative position and a lowered inoperative position, and a guide means mounted on the fixed frame assembly for urging the pivotable roller support frame to move from the lowered inoperative position to the raised operative position when the roller support assembly is slidably engaged with the fixed frame in the operative configuration.

37 Claims, 3 Drawing Sheets

IDLER FRAME ASSEMBLY

CROSS-REFERENCE TO RELATED APPLICATION

This application claims priority to Australian patent application number 2005905590, filed Oct. 17, 2005.

FIELD OF THE INVENTION

The present invention relates to an idler frame assembly, in particular to an idler frame assembly for conveyors.

BACKGROUND OF THE INVENTION

Typically, conveyors comprise a moving belt forming a continuous loop and supported by a plurality of idler frames. The idler frames support a plurality of rollers which are in operable communication with the moving belt, typically in a trough configuration to facilitate optimum volume capacity, and reduce friction between the belt and the idler frames. Typically, the idler frames are fixed to a main frame of the conveyor.

It is a time consuming and labour-intensive operation to remove a roller from the idler frame for repair, service or replacement, as the moving belt may have to be removed from the conveyor or at least disengaged from the idler frame in order to obtain access to the roller. Furthermore, the considerable weight of the conveyor belt means that there are significant occupational health and safety concerns with regard to lifting the conveyor belt and bracing it to secure it while the operation is undertaken.

An idler frame assembly for conveyers is described in U.S. Pat. No. 5,657,857. The idler frame assembly is disposed in a pivotal relationship to a stationary conveyor frame and is pivoted through about 90° in relation to the conveyor frame to remove the rollers of the idler frame from communication with the belt. Additionally, the idler frame assembly can be slidably removed from beneath the belt when pivoted to a position adjacent the conveyor frame, so as to expose the rollers of the idler frame assembly in order to repair or replace one or more of the rollers of the idler frame.

Thus, the method for servicing or replacing a roller of the support frame described in U.S. Pat. No. 5,657,857 consists of three steps: removing a stabilizing member which secures the support frame in an upright configuration wherein the rollers of the idler frame are in communication with the moving member, pivoting the support frame from an upright position to a substantially horizontal position to displace the rollers from communication with the moving member, and slidably exposing the rollers of the support frame from beneath the moving member.

The idler frame assembly described above relies on sufficient spacing between adjacent idler frame assemblies to allow the support frame to be pivoted to the substantially horizontal position disposed adjacent to the conveyor frame. Further, as the idler frame assembly is manufactured from heavy materials, the weight of the idler frame assembly could pose occupational health and safety problems when the idler frame assembly is pivoted to and from the upright position. Additionally, it would be more labour efficient to provide an idler frame assembly which required fewer than three operations in order to expose the rollers of the idler frame from beneath the moving member.

It is to be understood that, although prior art use and publications may be referred to herein, such reference does not constitute an admission that any of these form a part of the common general knowledge in the art, in Australia or any other country.

SUMMARY OF THE INVENTION

In a first aspect of the invention there is provided an idler frame assembly for a conveyor, the idler frame assembly comprising a fixed frame assembly mounted on the main frame, a roller support assembly slidably engaged with the fixed frame assembly, the roller support assembly being slidable relative to the fixed frame assembly between an operative configuration and a non-operative configuration, the roller support assembly comprising a pivotable roller support frame, the pivotable roller support frame being pivotable between a raised operative position and a lowered inoperative position, and a guide means mounted on the fixed frame assembly for urging the pivotable roller support frame to move from the lowered inoperative position to the raised operative position when the roller support assembly is slidably engaged with the fixed frame in the operative configuration.

In one embodiment of the invention the pivotable roller support frame has a free end and a fixed end, the pivotable roller support frame being pivotable about the fixed end between the raised operative position and the lowered inoperative position.

In one embodiment of the invention the fixed frame assembly comprises a distal end member and a proximal end member mountable on respective sides of a main frame of the conveyor and disposed in parallel relation to each other, the distal and proximal end members being interconnected by a pair of rod members disposed in spaced parallel relation to each other.

In one embodiment, the guide means is mounted on the distal end member of the fixed frame assembly. The guide means comprises an upright plate member. Typically, the upright plate member extends in parallel relation to, and is spaced equidistantly from, the rod members. In one embodiment, the upright plate member has a ramp portion. The ramp portion typically has an angle of inclination between 10° and 65°. Preferably, the angle of inclination is between 20° and 45°.

In another embodiment, the upright plate member has an engaging portion disposed above the ramp portion. The engaging portion comprises a finger for engaging the pivotable roller support frame in the raised operative configuration.

In one embodiment, the roller support assembly supports a plurality of rollers in a trough configuration. In some embodiments, respective rollers disposed on opposing sides of the trough configuration are inclined at an angle of between 10° and 65° above the horizontal. In other embodiments, the rollers disposed on opposing sides of the trough configuration are inclined at an angle of between 20° and 45° from the horizontal.

In one embodiment, the roller support assembly comprises an elongate base member spaced equidistantly between the rod members and disposed in parallel relation thereto, and at least one transversely disposed member mounted on the elongate base member. In some embodiments, the or each transversely disposed member is provided with a pair of apertures configured to slidably receive the rod members. In the preferred embodiment the roller support assembly is slidably engaged with the rod members.

In one embodiment of the invention, a proximal end of the elongate base member can be provided with an outwardly extending handle.

In one embodiment the roller support assembly further comprises a fixed roller support frame. The fixed roller support frame is mounted on the elongate base member of the roller support assembly. Typically, the fixed roller support frame is adapted to support two or more rollers comprising at least one inclined roller and at least one substantially horizontal roller. The inclined roller and the horizontal roller can be co-planar. Alternatively, the inclined roller and the horizontal roller can be offset in relation to one another. The or each inclined roller can be inclined at an angle of between 10° and 65° above the horizontal, preferably at an angle of between 20° and 45°.

The fixed roller support frame comprises at least a first pair of brackets and a second pair of brackets for supporting the inclined roller and the substantially horizontal roller, respectively. Each bracket of each respective pair is provided with a notch in an upper edge thereof for receiving and supporting rotational movement therein of an axle of a respective roller.

The first pair of brackets is mounted on the elongate base member adjacent to the proximal end of the elongate base member. The height of the first pair of brackets is configured to support the respective roller at an inclination of between 10° and 65° above the horizontal.

In one embodiment the fixed end of the pivotable roller support frame is hingedly fixed to the elongate base member of the roller support assembly. Typically, in the raised operative position the pivotable roller support frame is upwardly inclined at an angle of between 10° and 65° above the horizontal and at least one roller supported by the pivotable roller support frame is upwardly inclined at an angle between 10° and 65° relative to the fixed frame assembly.

The pivotable roller support frame comprises a pair of parallel elongate side bars interconnected with a pair of brackets adjacent the fixed end and the free end of the pivotable roller support frame, respectively. Each of the brackets is provided with a notch in an upper edge thereof for receiving and supporting rotational movement therein of an axle of the or each roller. The pivotable roller support frame is adapted to support the or each roller in a substantially horizontal configuration with respect to the pivotable roller support frame, regardless of the angle of inclination of the pivotable roller support frame.

A lower edge of the bracket at the free end is provided with a slot extending through a lower portion thereof. Typically, the slot is sized to receive, and accommodate the width of, the ramp portion of the guide means when the roller support assembly is in the operative configuration.

The bracket at the free end is also provided with an aperture disposed above and in alignment with the slot. The aperture is sized to receive the finger of the guide means when the roller support assembly is in the operative configuration, thereby securing the roller support assembly in the operative configuration.

In the description of the invention and the claims, except where the context requires otherwise due to express language or necessary implication, the words "comprise" or variations such as "comprises" or "comprising" are used in an inclusive sense, i.e. to specify the presence of the stated features, but not to preclude the presence or addition of further features in various embodiments of the invention.

BRIEF DESCRIPTION OF THE DRAWINGS

Preferred embodiments, incorporating all aspects of the invention, will now be described by way of example only with reference to the accompanying drawings, in which.

DETAILED DESCRIPTION OF THE PREFERRED EMBODIMENTS OF THE INVENTION

Figure 2:
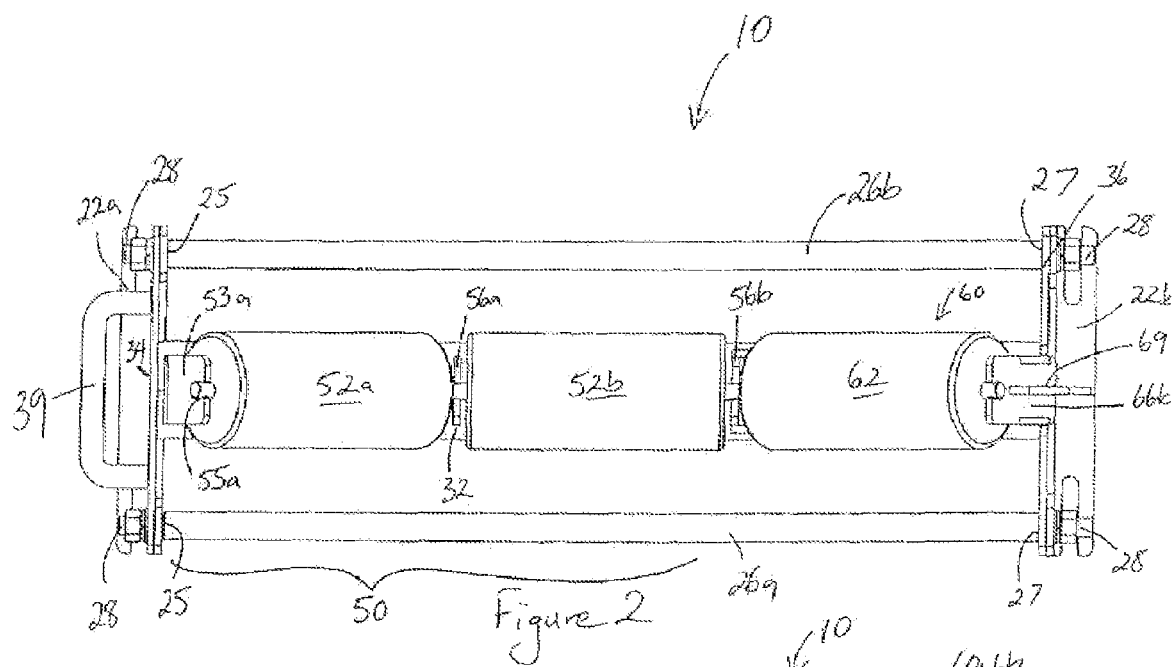
FIG. 2 is a plan view of the idler frame assembly shown in FIG. 1.

Before the preferred embodiment of the present apparatus is described, it is understood that this invention is not limited to the particular materials described, as these may vary. It is also to be understood that the terminology used herein is for the purpose of describing the particular embodiment only, and is not intended to limit the scope of the present invention in any way. It must be noted that as used herein, the singular forms "a", "an", and "the" include plural reference unless the context clearly dictates otherwise. Unless defined otherwise, all technical and scientific terms used herein have the same meanings as commonly understood by one of ordinary skill in the art to which this invention belongs.

Referring to the accompanying figures, there is provided an idler frame assembly 10 for a conveyor having a main frame and a moving member, such as a conveyor belt. It will be understood that in practice a plurality of idler frame assemblies 10 provided are mounted and in spaced adjacent relationship with one another on the main frame of the conveyor.

The idler frame assembly 10 includes a fixed frame assembly 20 mounted on the main frame, and a roller support assembly 30 slidably engaged with the fixed frame assembly 20 and in operable communication with the moving member.

The main frame includes a first longitudinal member and a second longitudinal member 5b disposed in parallel relation to each other. The longitudinal members 5a, 5b are preferably formed of a substantially rigid material to provide sufficient structural support to one or more idler frame assemblies 10 mounted thereon. In the preferred construction, the longitudinal members 5a, 5b of the conveyor frame are formed of metal or a metal alloy such as, for example, iron or steel. The longitudinal members 5a, 5b of the conveyor frame can, of course, be formed of a wide variety of other suitable materials sufficiently sturdy to provide structural support to one or more idler frame assemblies 10.

The fixed frame assembly 20 includes a proximal longitudinal plate member 22a and a distal longitudinal plate member 22b disposed in parallel relation to each other. The proximal and distal longitudinal plate members 22a, 22b are mounted, respectively, on the first and second longitudinal members 5a, 5b of the main frame in longitudinal alignment therewith.

The proximal longitudinal plate member 22a is provided with a pair of upright plates 21 disposed at opposing ends 23 thereof. Each upright plate 21 is provided with a centrally disposed aperture 25.

The distal longitudinal plate member 22b is provided with an upright web plate 24 having a pair of apertures 27 disposed in opposing ends 29 of the upright web plate 24. Each aperture 27 is disposed in parallel longitudinal alignment with a respective aperture 25 of the upright plates 21.

The fixed frame assembly 20 further includes a first rod member 26a and a second rod member 26b disposed in spaced parallel relation to each other. Preferably, the first and second rod members 26a, 26b have a circular cross section. Opposing ends 28 of the first and second rod members 26a, 26b are adapted to be received in the longitudinally aligned apertures 25, 27 of the upright plates 21 and the upright web plate 24. Typically, the opposing ends 28 are threaded and secured in respective apertures 27 with a nut, washer, and spring washer.

A guide means 40 is orthogonally mounted on the upright web plate 24 of the fixed frame assembly 20. The guide means 40 comprises an upright plate member 42 extending in parallel relation to, and spaced equidistantly from, the first and second rod members 26a, 26b. The plate member 42 is provided with a ramp portion 44, and an engaging portion 46 disposed above the ramp portion 44. The engaging portion 46 comprises a finger 48. In the figures the ramp portion 44 is shown as having an angle of inclination of 35°. However, it will be understood that the angle of inclination may be in a range of 10° to 65°, preferably 20° to 45°.

The roller support assembly 30 is slidably engaged with the first and second rod members 26a, 26b in an arrangement whereby the roller support assembly 30 is slidable relative to the fixed frame assembly 20 between an operative configuration wherein the roller support assembly 30 is in operable communication with the moving member and a non-operative configuration.

The roller support assembly 30 includes an elongate base member 32 spaced equidistantly between the first and second rod members 26a, 26b and disposed in parallel relation thereto. In the embodiment shown in the Figures, the elongate base member 32 is shown as an angle bar. While the elongate base member 32 may be formed from alternative elongate profiles and is not limited to an angle bar profile, the advantages that the angle bar profile affords the elongate base member 32 and the invention will become apparent in later discussion.

The elongate base member 32 has a proximal end 31a and a distal end 31b. A proximal end bar 34 is mounted on the proximal end 31a and a distal end bar 36 is mounted on the distal end 31b. The proximal and distal end bars 34, 36 are provided with a pair of apertures 33, 35 in respective opposing ends thereof. Each aperture 33 of the proximal end bar 34 is disposed in parallel longitudinal alignment with a respective aperture 35 of the distal end bars 36. Additionally, the apertures 33, 35 are in parallel longitudinal alignment with respective apertures 25, 27 of the fixed frame assembly 20.

The elongate base member 32 can be also provided with a disposed guide bar mounted on one side of the elongate base member 32. The guide bar is provided with an aperture disposed in parallel alignment with apertures 33, 35, and apertures 25, 27 of the fixed frame assembly 20.

Figure 1:
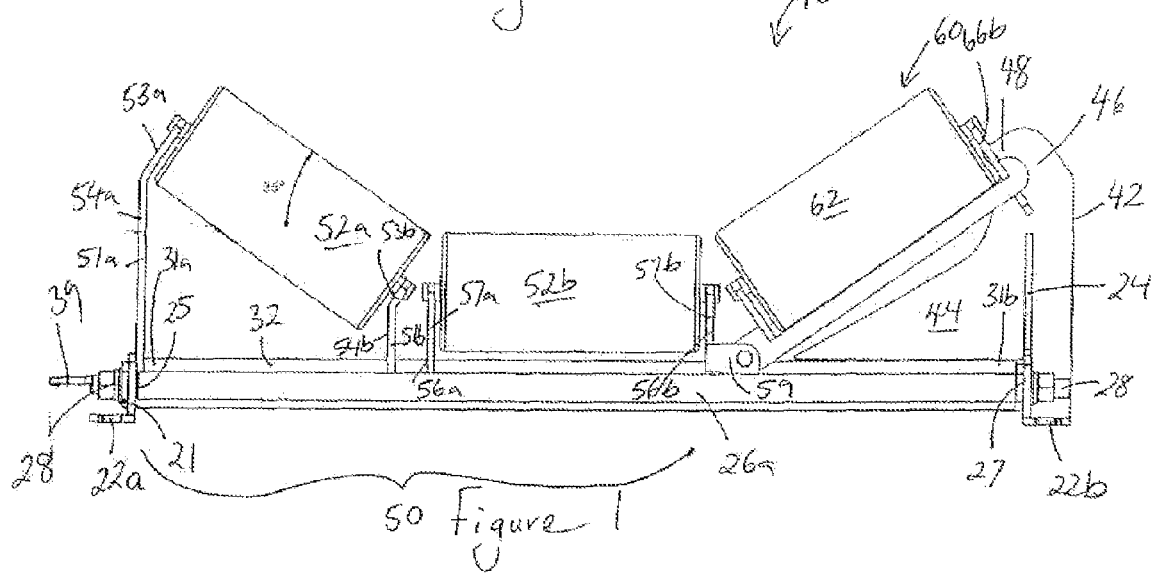
FIG. 1 is a side view of the idler frame assembly in an operative configuration in accordance with the present invention.

The apertures 33, 35, are preferably configured with an internal diameter sufficient to slidably receive first and second rod members 26a, 26b. In this way, the roller support assembly 30 is slidable along the length of the first and second rod members 26a, 26b in relation to the fixed frame assembly 20 between the non-operative configuration wherein the roller support assembly 30 is disengaged from the moving member as shown in FIG. 3 and the operative configuration wherein the roller support assembly 30 is in operable communication with the moving member as shown in FIG. 1.

Figure 3:
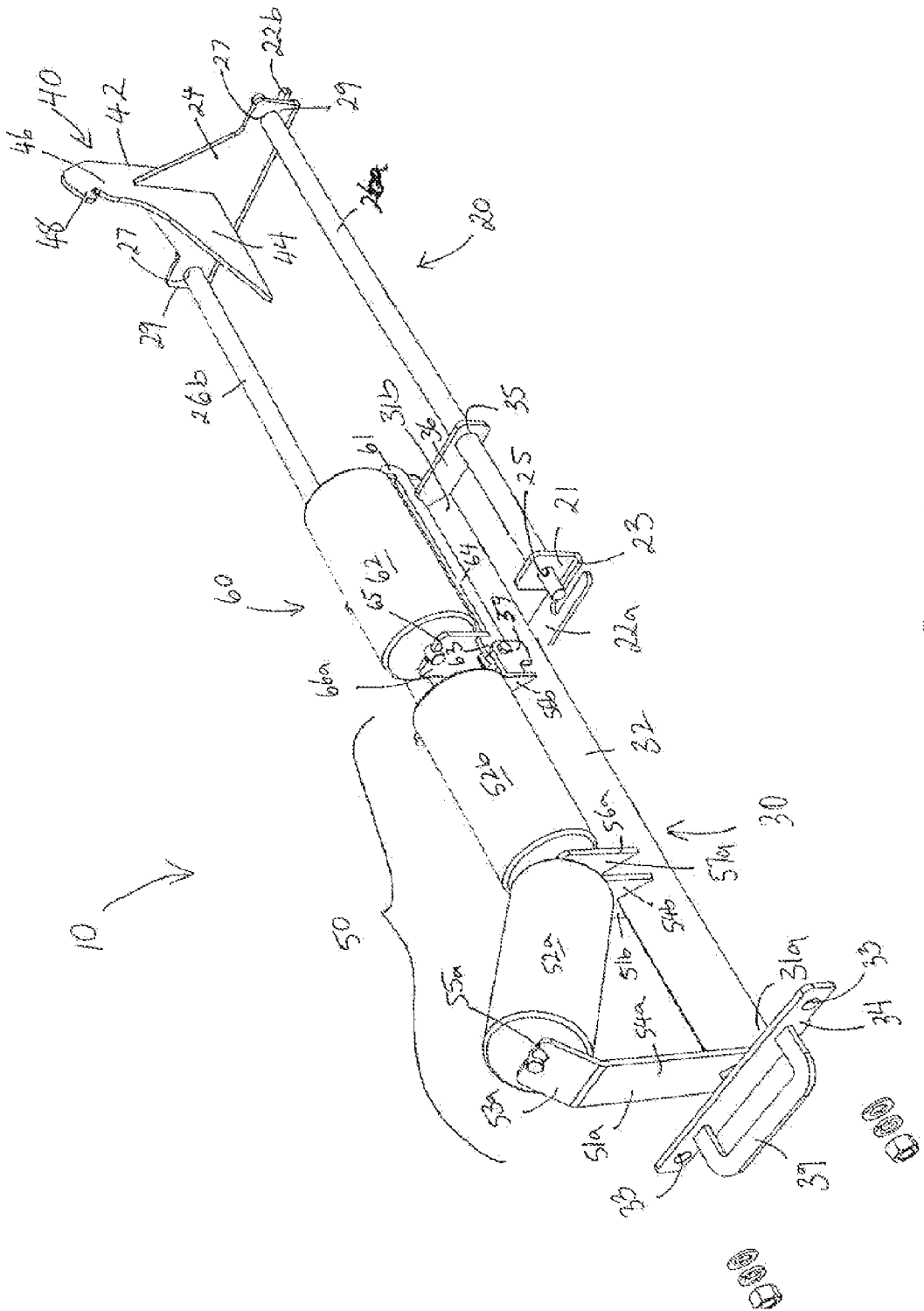
FIG. 3 is a perspective view of the idler frame assembly of FIGS. 1 and 2 shown in a non-operative configuration; and, FIG. 4 is a detailed view of a pivotable roller support frame of the idler frame assembly of FIGS. 1 to 3.

The proximal end bar 34 is provided with an outwardly extending handle 39 so that an operator may grasp the handle 39 and draw the roller support assembly 30 towards the operator to obtain access to the rollers supported by the roller support assembly 30 in the non-operative configuration as shown in FIG. 3. In a similar manner, the operator may grasp the handle 39 and push the roller support assembly 30 back to the operative position as shown in FIG. 1 and re-engage the roller support assembly 30 with the moving member.

The roller support assembly 30 further includes a fixed roller support frame 50 mounted on the elongate base member 32. Referring to the figures, the fixed roller support frame 50 is adapted to support two rollers 52, an inclined roller 52a and a substantially horizontal roller 52b, in adjacent co-planar alignment with each other. The inclined roller 52a is inclined at 35° above the horizontal. However, it will be understood that the fixed roller support frame 50 can be adapted to support more than the two rollers 52 in part of a trough configuration. Additionally, it will be understood that one or more inclined rollers 52 can be inclined at an angle between 10° and 65°, preferably 20° to 45°.

The fixed roller support frame 50 comprises a pair of first brackets 54a, 54b mounted on the elongate base member 32 for supporting the inclined roller 52a and a pair of second brackets 56a, 56b mounted on the elongate base member 32 adjacent to the pair of first brackets 54a, 54b for supporting the horizontal roller 52b.

First bracket 54a is adjacent to the proximal end bar 34, and comprises an elongate upright member 51a mounted at a lowermost end thereof on the elongate base member 32. An uppermost end of the upright member 51a is integral with a forwardly inclined member 53a provided with a notch 55a in an upper edge thereof for receiving and supporting rotational movement therein of an axle of the inclined roller 52a. The forwardly inclined member 53a is inclined at an angle of 55° from the vertical.

First bracket 54b is spaced apart from first bracket 54a, and comprises an elongate upright member 51b mounted at a lowermost end thereof on the elongate base member 32. An uppermost end of the upright member 51b is integral with a forwardly inclined member 53b provided with a notch 55 in an upper edge thereof for receiving and supporting rotational movement therein of an axle of the inclined roller 52a. The forwardly inclined member 53b is also inclined at an angle of 55° from the vertical.

The elongate upright member 51a and forwardly inclined member 53a are proportionally longer than the elongate upright member 51b and forwardly inclined member 53b, the proportion and distance between the elongate upright members 51a, 51b being such that the inclined roller 52a is supported at an inclination of 35° from the horizontal.

Second bracket 56a is disposed adjacent to first bracket 54b, and comprises an upright member 57a mounted at a lowermost end thereof on the elongate base member 32. An upper edge of the upright member 57a is provided with a notch 55 in an upper edge thereof for receiving and supporting rotational movement therein of an axle of the horizontal roller 52b.

Second bracket 56b is spaced apart from second bracket 56a, preferably at a distance marginally shorter than the length of the axle of the horizontal roller 52b. The second bracket 56b comprises an upright member 57b mounted at a lowermost end thereof on the elongate base member 32. An upper edge of the upright member 57b is provided with a notch 55 in an upper edge thereof for receiving and supporting rotational movement therein of the axle of the horizontal roller 52b.

Second bracket 56a and second bracket 56b are substantially of the same height as each other, the arrangement being such that the horizontal roller 52b is supported in substantially a horizontal configuration. The second brackets 56a, 56b are substantially the same height, or marginally shorter, than the first bracket 54b. In this arrangement, the inclined roller 52a downwardly inclines towards the horizontal roller 52b.

In the embodiment shown in the Figures, the roller support assembly 30 is further provided with a pair of angle members 59 mounted to the lowermost end of the upright member 57b and to the elongate base member 32.

The roller support assembly 30 further includes a pivotable roller support frame 60 having a free end 61 and a fixed end 63 hingedly attached to the roller support assembly 30. Preferably, fixed end 63 of the pivotable roller support frame 60 is hingedly attached to the pair of angle members 59 mounted to the elongate base member 32 and the second bracket 56b.

The pivotable roller support frame 60 is pivotable about the angle members 59 between an inclined configuration as shown in FIG. 1 and a substantially horizontal configuration as shown in FIG. 3. In the embodiment shown in the figures, the pivotable roller support frame 60 is upwardly inclined at 35° above the horizontal when in the inclined configuration and a roller 62 supported by the pivotable roller support frame 60 is also upwardly inclined at 35° relative to the fixed frame assembly 30. The pivotable roller support frame 60 is adapted to support the roller 62 in a substantially horizontal configuration with respect to the pivotable roller support frame 60, regardless of the angle of inclination of the pivotable roller support frame 60.

Figure 4:
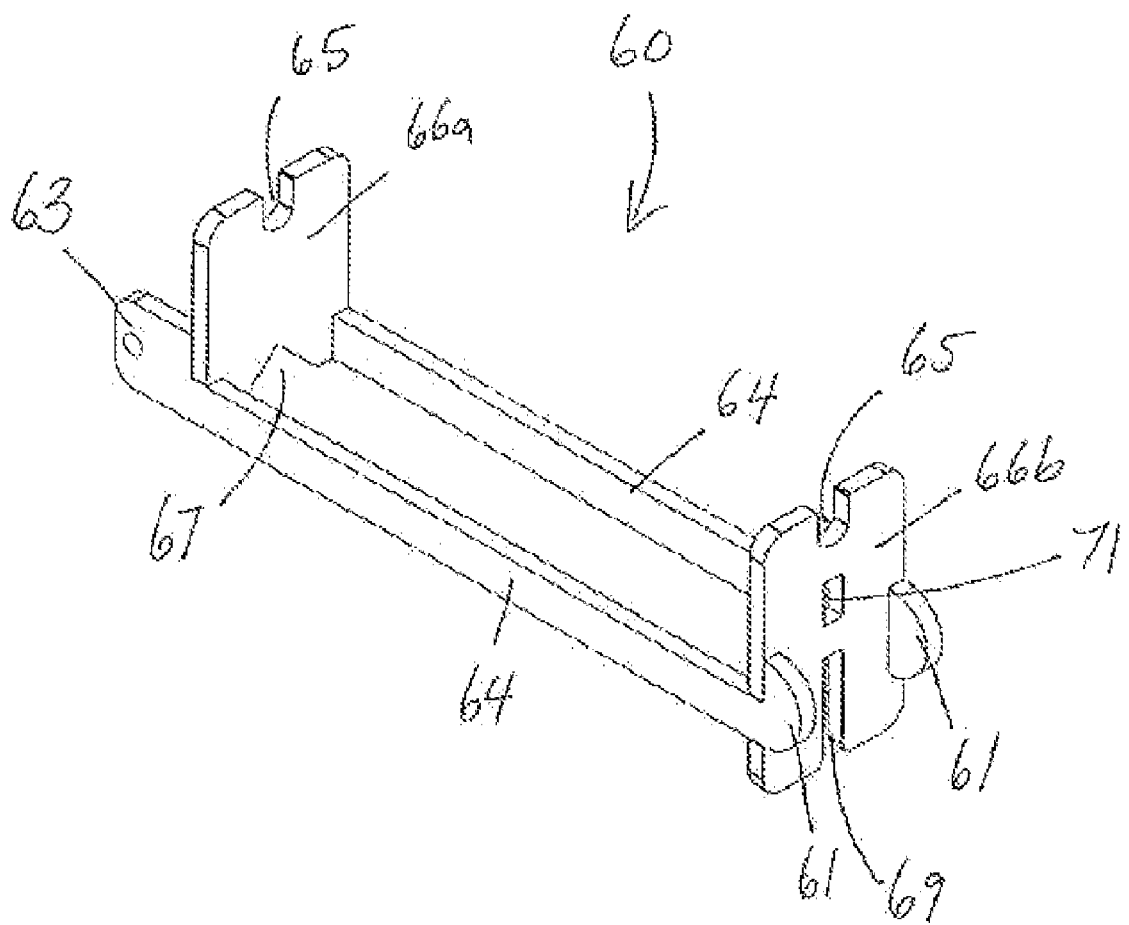

Referring to FIG. 4, the pivotable roller support frame 60 comprises a pair of parallel elongate side bars 64 interconnected with a pair of third brackets 66a, 66b. Third bracket 66a is disposed adjacent to the fixed end 63 and third bracket 66b is disposed adjacent to the free end 61. Each of third brackets 66a, 66b is provided with a notch 65 in an upper edge thereof for receiving and supporting rotational movement therein of an axle of the roller 62.

A lower edge of the third bracket 66a is provided with a notch 67 of similar profile as the elongate base member 32. In the embodiment shown in the Figures, the notch 67 is triangular and sized to slidably accommodate an upper portion of the elongate base member 32.

A lower edge of the third bracket 66b is provided with a slot 69 extending through a lower portion of the third bracket 66b. The slot 69 is sized to receive, and accommodate the width of, the ramp portion 44 of the guide means 40 when the roller support assembly 30 is in the operative configuration.

The third bracket 66b is also provided with an aperture 71 disposed above and in alignment with the slot 67. The aperture 71 is sized to receive the finger 46 of the guide means 40 when the roller support assembly 30 is in the operative configuration.

In using the idler frame assembly 10 of the embodiment, the roller support assembly 30 can adopt the operative configuration described above whereby rollers 52a, 52b, 62 are conveniently oriented in a shallow U-shape for operably engaging the moving member of the conveyor. In that configuration the pivotable roller support frame 60 is inclined to a predetermined angle of inclination, preferably between 10° and 65°, by the ramp portion 44 of the guide means 40. The notch 67 and the slot 69 of the third brackets 66a, 66b, respectively, receive the ramp portion 44 of the guide means 40 so that the pivotable roller support frame 60 is supported in an inclined orientation thereon. The finger 46 of the guide means 40 is received by the aperture 71 to secure the pivotable roller support frame 60 in the inclined configuration. The fixed roller support frame 50 is disposed in longitudinal alignment with the pivotable roller support frame 60 and between the first and second rod members 26a, 26b of the fixed frame assembly 20. In this way, the rollers 52a, 52b, 62 are supported in a trough configuration.

The roller support assembly 30 can then be positioned from the operative configuration to the non-operative configuration by sliding the roller support assembly 30 relative to the fixed frame assembly 20. An operator can grasp the handle 39 and draw the roller support assembly 30 towards himself to obtain access to the rollers 52a, 52b, 62 supported by the roller support assembly 30.

As the operator draws the roller support assembly 30 towards himself, the pivotable roller support frame 60 is disengaged from the finger 46 of the guide means, allowing the pivotable roller support frame 60 to pivot about its fixed end 63 and slide over the ramp portion 40 of the guide means, its angle of inclination decreasing until the roller support assembly 30 is substantially horizontal. In this way, the roller 62 is disengaged from operable communication with the conveyor without any obstruction from a lower oriented portion of the conveyor which is generally in operable communication with the horizontal roller 52b when the roller support assembly 30 is in the operative configuration.

The roller support assembly 30 can be slid further along the first and second rod members 26a, 26b of the fixed frame assembly 20 until the operator obtains access to either one or all the rollers 52a, 52b, 62 for service, repair, or maintenance purposes.

The roller support assembly 30 can be returned to the operative configuration, in which the rollers 52a, 52b, 62 operably engage the moving member of the conveyor in a trough configuration, by sliding the roller support assembly 30 along the first and second rod members 26a, 26b towards the fixed frame assembly 20 and guide means 40. When the pivotable roller support frame 60 approaches the guide means 40, the notch 67 and slot 69 of the third bracket 66b receives and engages the ramp portion 44 of the guide means 40. As the pivotable roller support frame 60 travels over the ramp portion 44, it is caused to pivot about its fixed end 63, progressively increasing the angle of inclination of the pivotable roller support frame 60, to a predetermined angle of inclination, preferably 10° to 65°, above the horizontal, at which angle of inclination the roller 62 operable engages the moving member of the conveyor. The aperture 69 of the third bracket 66b receives the finger 46 of the guide means 40 to secure the pivotable roller support frame 60 in the operative configuration.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description.

The invention claimed is:

1. An idler frame assembly for a conveyor, the idler frame assembly comprising:
a fixed frame assembly;
a roller support assembly engageable with the fixed frame assembly, the roller support assembly being slidable relative to the fixed frame assembly between an operative configuration and a non-operative configuration;

the roller support assembly comprising a roller support frame pivotable between a raised operative position and a lowered inoperative position;

a guide device mounted on the fixed frame assembly so as to be fixed relative thereto, the guide device arranged so as to urge the pivotable roller support frame to move from the lowered inoperative position to the raised operative position when the roller support assembly is moved toward the operative configuration;

an engaging portion disposed at an end of the fixed frame assembly adjacent the guide device, and the engaging portion and the roller support assembly being configured such that the engaging portion mates with the roller support assembly when the roller support assembly is in the operative configuration, and thereby constrains movement of the roller support assembly in a plane perpendicular to the direction of slidable movement of the roller support assembly; and a securing device disposed at an end of the fixed frame assembly remote from the guide device, the securing device constraining slidable movement of the roller support assembly and thereby securing the roller support assembly in the operative configuration.

2. The idler frame assembly according to claim 1, wherein the pivotable roller support frame has a free end and a fixed end, the pivotable roller support frame being pivotable about the fixed end between the raised operative position and the lowered inoperative position.

3. The idler frame assembly according to claim 1, wherein the fixed frame assembly comprises a distal end member and a proximal end member mountable on respective sides of a main frame of the conveyor and disposed in parallel relation to each other, the distal and proximal end members being interconnected by a pair of rod members disposed in spaced parallel relation with one another.

4. The idler frame assembly according to claim 3, wherein the guide device is mounted on the distal end member of the fixed frame assembly.

5. The idler frame assembly according to claim 3, wherein the guide device comprises an upright plate member.

6. The idler frame assembly according to claim 5, wherein the upright plate member has a ramp portion.

7. The idler frame assembly according to claim 6, wherein the ramp portion has an angle of inclination between 10° and 65°.

8. The idler frame assembly according to claim 7, wherein the angle of inclination is between 20° and 45°.

9. The idler frame assembly according to claim 5, wherein the upright plate member has an engaging portion disposed above the ramp portion.

10. The idler frame assembly according to claim 9, wherein the engaging portion comprises a finger for engaging the pivotable roller support frame in the raised operative configuration.

11. The idler frame assembly according to claim 3, wherein the roller support assembly further comprises an elongate base member having a proximal end and a distal end, the elongate base member being spaced equidistantly between the rod members and disposed in parallel relation thereto.

12. The idler frame assembly according to claim 3, wherein the roller support assembly is slidably engaged with the rod members.

13. The idler frame assembly according to claim 11, wherein at least one transversely disposed member is mounted on the elongate base member.

14. The idler frame assembly according to claim 13, wherein the or each transversely disposed member is provided with a pair of apertures configured to slidably receive the rod members.

15. The idler frame assembly according to claim 11, wherein the proximal end of the elongate base member is provided with a handle.

16. The idler frame assembly according to claim 1, wherein the roller support assembly further comprises a fixed roller support frame.

17. The idler frame assembly according to claim 1, wherein the roller support assembly supports a plurality of rollers in a trough configuration.

18. The idler frame assembly according to claim 17, wherein respective rollers disposed on opposing sides of the trough configuration are inclined at an angle of between 10° and 65° above the horizontal.

19. The idler frame assembly according to claim 18, wherein the rollers disposed on opposing sides of the trough configuration are inclined at an angle of between 20° and 45° from the horizontal.

20. The idler frame assembly according to claim 16, wherein the fixed roller support frame is adapted to support two or more rollers comprising at least one inclined roller and at least one substantially horizontal roller.

21. The idler frame assembly according to claim 20, wherein the inclined roller and the horizontal roller are coplanar.

22. The idler frame assembly according to claim 20, wherein the inclined roller and the horizontal roller are offset with respect to one another.

23. The idler frame assembly according to claim 20, wherein the or each inclined roller is inclined at an angle of between 10° and 65° above the horizontal.

24. The idler frame assembly according to claim 23, wherein the or each inclined roller is inclined at an angle of between 20° and 45° above the horizontal.

25. The idler frame assembly according to claim 20, wherein the fixed roller support frame comprises at least a first pair of brackets and a second pair of brackets for supporting the inclined roller and the substantially horizontal roller, respectively.

26. The idler frame assembly according to claim 25, wherein each bracket is provided with a notch in an upper edge thereof for receiving and supporting rotational movement therein of an axle of the inclined roller or the substantially horizontal roller.

27. The idler frame assembly according to claim 25, wherein the roller support assembly further comprises an elongated base member having a proximal end and a distal end, the first pair of brackets being mounted on, and adjacent to the proximal end of, the elongate base member.

28. The idler frame assembly according to claim 1, wherein the pivotable roller support frame is adapted to support a roller in a substantially horizontal configuration with respect to the pivotable roller support frame, regardless of the angle of inclination of the pivotable roller support frame with respect to the fixed frame assembly.

29. The idler frame assembly according to claim 28, whereby in the raised operative position, the pivotable roller support frame is upwardly inclined at an angle of between 10° and 65° above the horizontal and the roller supported by the pivotable roller support frame is upwardly inclined at substantially the same angle as the pivotable roller support frame relative to the fixed frame assembly.

30. The idler frame assembly according to claim 11, wherein the fixed end of the pivotable roller support frame is hingedly fixed to the elongate base member of the roller support assembly.

31. The idler frame assembly according to claim 11, wherein the pivotable roller support frame comprises a pair of third brackets disposed adjacent to the fixed end and the free end of the pivotable roller support frame, respectively, and interconnected with a pair of parallel elongate side bars.

32. The idler frame assembly according to claim 31, wherein each of the third brackets is provided with a notch in an upper edge thereof for receiving and supporting rotational movement therein of an axle of the or each roller.

33. The idler frame assembly according to claim 31, wherein a lower edge of the third bracket disposed at the free end is provided with a slot extending through a lower portion thereof.

34. The idler frame assembly according to claim 33, wherein the slot is sized to receive, and accommodate the width of, the ramp portion of the guide device when the roller support assembly is in the operative configuration.

35. The idler frame assembly according to claim 33, wherein the third bracket disposed at the free end is also provided with an aperture therethrough, disposed above and in substantially vertical alignment with the slot.

36. The idler frame assembly according to claim 35, wherein the aperture is sized to receive the finger of the guide device when the roller support assembly is in the operative configuration, thereby securing the roller support assembly in the operative configuration.

37. A conveyor comprising a main frame, a moving member, and a plurality of idler frame assemblies mounted on the main frame and in operable communication with the moving member, wherein the idler frame assemblies comprise:
 a fixed frame assembly;
 a roller support assembly slidably engaged with the fixed frame assembly, the roller support assembly being slidable relative to the fixed frame assembly between an operative configuration and a non-operative configuration;
 the roller support assembly comprising a pivotable roller support frame, the pivotable roller support frame being pivotable between a raised operative position and a lowered inoperative position; and,
 a guide means mounted on the fixed frame assembly for urging the pivotable roller support frame to move from the lowered inoperative position to the raised operative position when the roller support assembly is slidably engaged with the fixed frame assembly in the operative configuration.

* * * * *